United States Patent

[11] 3,564,145

[72] Inventors Herman Deutsch
Raleigh;
Delbert M. Knepper, Sr., Durham;
Walter D. Van Gieson, Jr; Arthur Warner,
Raleigh, N.C.

[21] Appl. No. 820,406

[22] Filed Apr. 30, 1969

[45] Patented Feb. 16, 1971

[73] Assignee International Business Machines Corporation
Armonk, N.Y.

[54] SERIAL LOOP DATA TRANSMISSION SYSTEM FAULT LOCATOR
6 Claims, 7 Drawing Figs.

[52] U.S. Cl. .......... 179/15

[51] Int. Cl. .......... H04j 3/14

[50] Field of Search .......... 179/15(AL) (AL), 15 (T)

[56] References Cited

UNITED STATES PATENTS 3,458,661 7/1969 Forde et al. .......... 179/15

*Primary Examiner*—Kathleen H. Claffy
*Assistant Examiner*—Douglas W. Olms
*Attorneys*—Hanifin and Jancin and John B. Frisone

ABSTRACT: Terminals in a serial loop data transmission system automatically monitor input data to detect no data and mutilated data conditions. When either condition is detected, signals including the unique terminal address are automatically generated. The generated signals satisfy all down stream terminals and the central controller within a predetermined time is provided with the address of the terminal immediately following the fault and an indication of the type of fault.

INVENTORS
HERMAN DEUTSCH
DELBERT M. KNEPPER, SR.
WALTER D. VAN GIESON, JR.
ARTHUR S. WARNER
BY John B Frisone
ATTORNEY

SERIAL LOOP DATA TRANSMISSION SYSTEM FAULT LOCATOR

BACKGROUND

1. Field of the Invention

The invention relates to serial loop data communications systems and more particularly to means for precisely physically locating transmission faults in the communications system when they occur.

2. Description of the Prior Art

Serial loop data transmission systems are extremely attractive for connecting large numbers of data terminals which are widely scattered where the distances between terminals is generally insignificant compared to the distance between the central controller and the more remote terminals. This technique is applicable to private communications systems as well as to lease line systems over very long distances.

One system which has been in operation for some time utilizes a pair of loops to achieve true full duplex operation. In the event that one loop develops a fault, the other loop may be operated in a half duplex mode to enable communications on a limited basis while the fault is corrected.

In those instances where full duplex operation is not available due to cost or other reasons, a fault causes a complete interruption of communications. If the system includes a large number of terminals with many miles of wire interconnecting them, fault location may be a long and arduous task.

SUMMARY OF THE INVENTION

The invention contemplates a fault locating and signalling device for use in a serial loop data transmission system comprising, means for monitoring the incoming signal line for detecting a complete loss of signal or mutilated signals, signal generator means for generating a first or a second signal, each of which includes a coded address portion unique to the monitoring terminals in response to the type of fault detected by the monitoring means, and means under control of monitoring means for inserting the generator means output in the outgoing line.

One object of the invention is to provide a means for detecting and signalling the physical location of a fault occurring in a serial loop data transmission system.

Another object of the invention is to provide a fault locator as set forth above which will detect and signal an open line condition.

A further object of the invention is to provide a fault locator as set forth above which will detect and signal a data mutilation condition.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
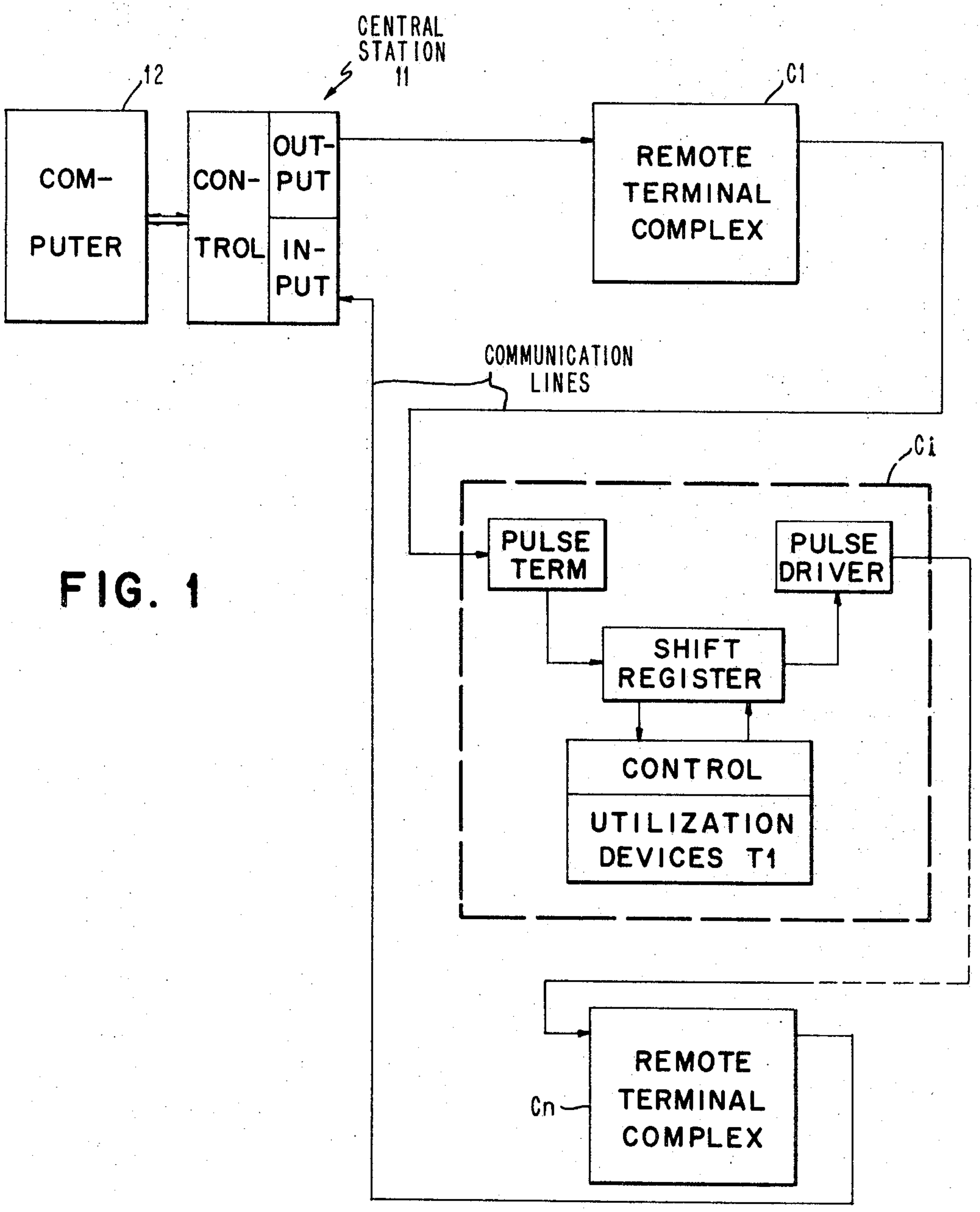
FIG. 1 is a block diagram of a communications system in which the invention may be used.

A serial loop communications system in which the novel fault locator may be employed is shown in FIG. 1 and includes a central station 11 having a control section and input section and an output section connected via conventional means to a computer 12. Computer 12 receives and provides data to a plurality of remote terminals T1—T*n*. The terminals are arranged in complexes C1—C*n*. The output section of the central station is connected to the first terminal complex C1 via a twisted pair of conductors which may be ordinary AWG22 wire in a twisted pair configuration. The twisted pair of conductors are connected to a pulse terminating circuit located within the complex, the output of which is connected to a shift register. As the pulses defining the bit patterns transmitted on the twisted pair are received, they are inserted in the shift register. The shift register has a finite length and delays the pulses coming into the first complex via an amount of time equal to the finite length of the shift register. The last stage of the shift register is connected to a pulse driver circuit located within the remote terminal complex and has its output connected to a similar twisted pair. In this manner, each of the terminal complexes is connected. The last terminal complex C*n* has its pulse driver connected to the input section of the central station. Thus, data supplied by the computer is transmitted by the computer to the output section through each of the terminal complexes in a series loop and comes back to the input section of the central station 11.

Data originating at any terminal complex is inserted in the stream of data and is sent back through subsequent remote terminal complexes to the input section of the central station 11. Each of the terminal complexes has a control section connected to the shift register and looks at the finite number of bits contained therein periodically to determine various factors concerning the information in the shift register. The data residing in the shift register is utilized in a parallel manner within the utilization devices T1—T*n* connected to the various terminal complexes.

The system illustrated in FIG. 1 is susceptible to two types of faults. The transmission path at any place in the serial loop may become interrupted. This interruption may occur between complexes or may occur at the complex itself. The second type of fault may be encountered when one of the complexes misuses data on the line and mutilates the data coming in or transmits mutilated data onto the line. Both of these faults are difficult to locate at the central control station. Since there may be as much as 100,000 feet of external wiring within which to locate the fault.

A detailed description of the communications system shown in FIG. 1 for illustrating the environment in which the invention may be practiced can be found in a copending patent application filed by Herman Deutsch et al. entitled, "Time Division Multiplex Communications System," Ser. No. 791334 filed Jan. 15, 1969 and assigned to the same assignee as this application. This application will be referred to henceforth in the specification as the communications system.

The communications system transmits data in binary form in which ones and zeros are transmitted in sequence serially on the transmission line to the various devices. Bipolar pulses are utilized for coding the data. A bipolar pulse representing a one has a fixed phase relationship and a bipolar pulse representing a zero is of opposite phase. Each pulse includes a reference level at the termination of the bit period. With this mode of transmission, the average DC current is zero. For organization purposes, a number of pulses represent a byte or unit of information and a selected number of bytes or units of information are designated a communications channel.

Figure 2:
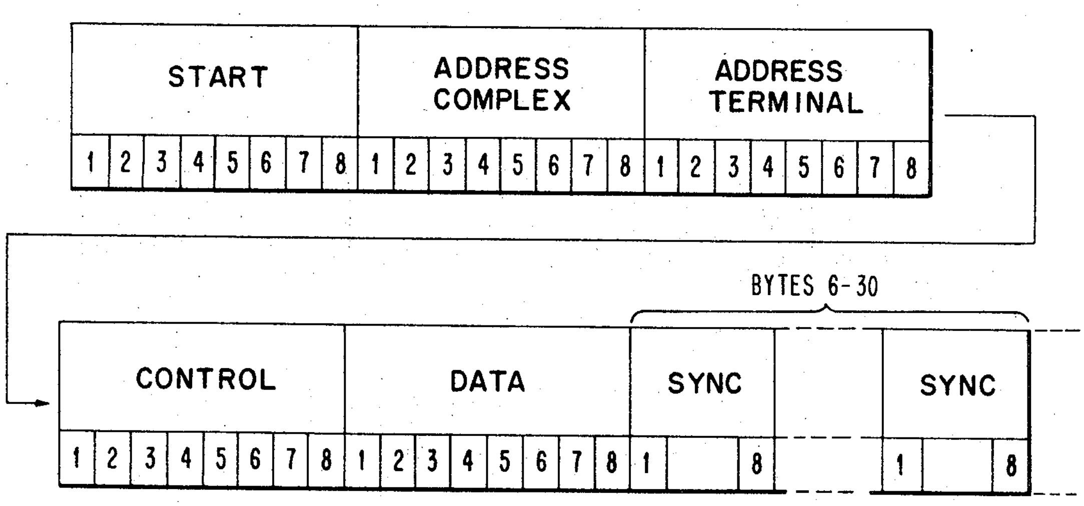
FIGS. 2 and 3 are diagrammatic representations of serial data arrangement utilized in the serial loop communications system illustrated in FIG. 1.

FIG. 2 is a diagrammatic representation for the organization of a channel. In FIG. 2, the byte unit of data includes eight bits of information which may be either zero or one or a combination thereof, each defining specific information. There are included within the communications channel, 30 such bytes. The first byte of a channel is the start byte. This byte is a unique eight bit code which is interpreted as defining the start condition of a channel. The second byte is a unique eight bit code defining a terminal complex. The communications system may have as many as 100 terminal complexes serially connected in a loop. The third byte is a unique eight bit code which defines the address of a terminal device connected to particular terminal complex defined by the second byte. The fourth data byte is a unique eight bit code which is utilized for control purposes. This eight bit code defines a function which may be performed with a particular communications channel within which it resides. The fifth byte is a unique eight bit code which defines data. The data contained in the fifth byte may be utilized for operating a printer, displaying the time of day, illuminating lights or for any other purpose. It may also be used to input information from a terminal connected to a complex to the computer when the appropriate control byte is present. Bytes 6—30 are utilized for synchronization purposes in the transmission system.

Figure 3:
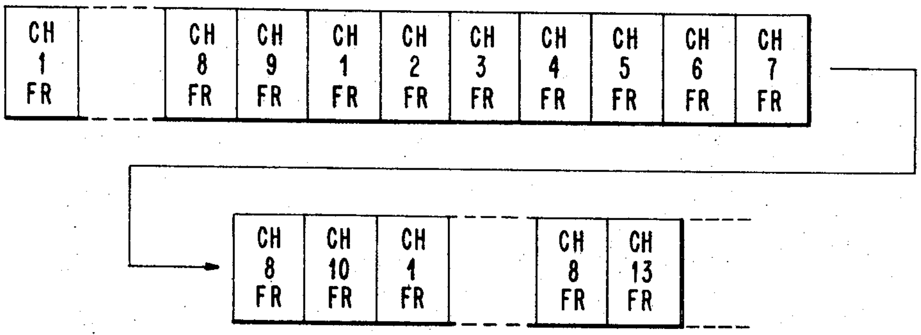

FIG. 3 is a diagrammatic representation of the various channels in their sequential order. Channels 1—9 appear in sequence. This group is followed by channels 1—8 and 10 which is again followed by channels 1—8 and 11. The series repeats after 1—8 and 13 have been transmitted or received. Approximately from 2 to 4 channels will be out on the external loop on any given time. The remaining channels are stored in the central station. This arrangement provides channels having two rates. Channels 1—8 are transmitted at a first high speed rate and channels 9—13 are transmitted at a second much slower rate. This arrangement provides channels suitable for different terminal devices connected to the various remote terminal complexes on the loop. Channels 1—8 are used for transmitting data from badge readers, card readers, keyboards, etc. to the central terminal while channels 9—13 which are much slower are used for transmitting data from the central to the various terminal complexes to terminals such as printers, clocks, or other display devices.

Figure 4:
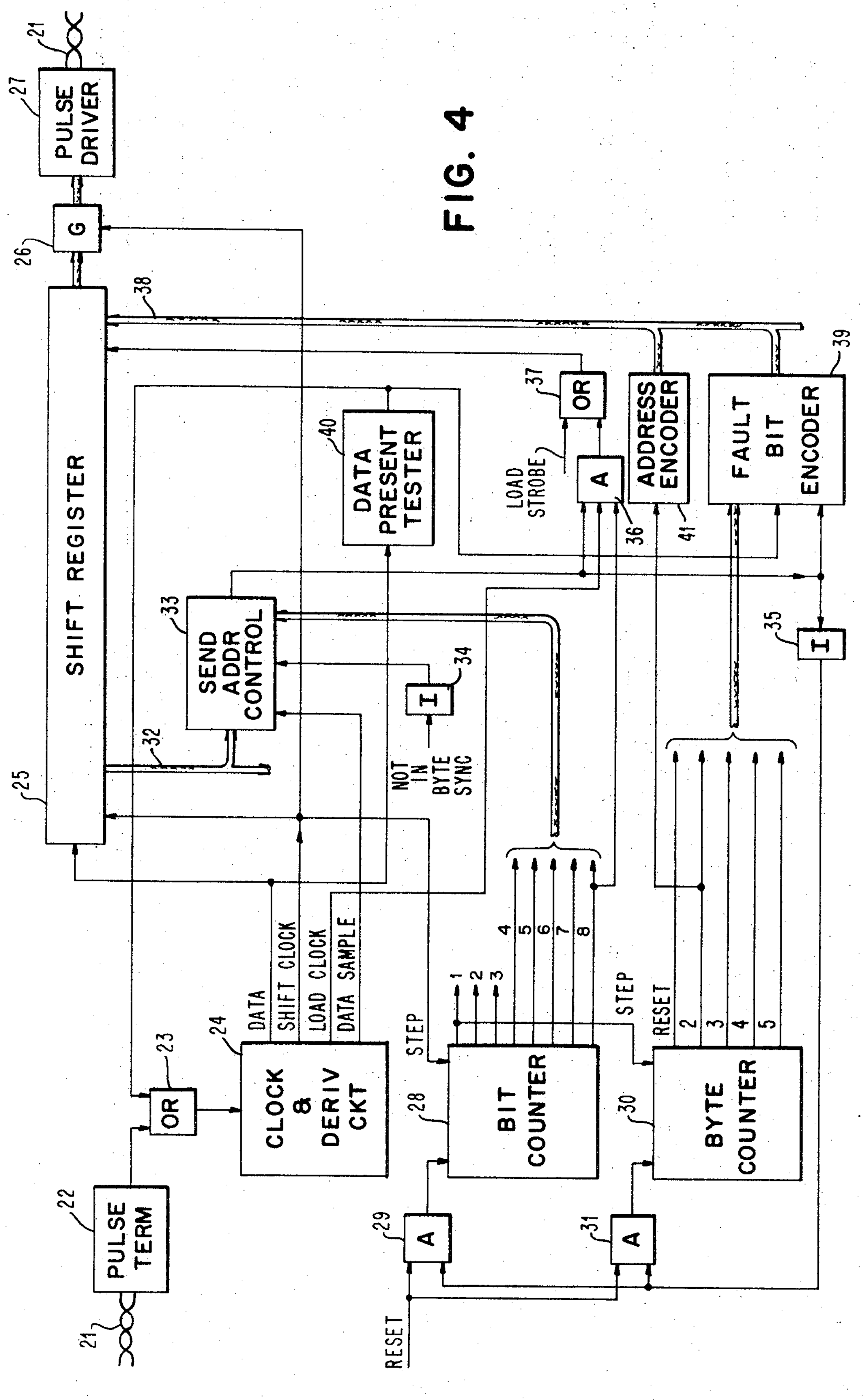
FIG. 4 is a block diagram of the preferred embodiment of the invention.

FIG. 4 is a partial block diagram of the remote terminal complex shown in FIG. 1 and includes only as much hardware as is necessary to implement the invention, the remaining hardware included in this functional element may be found in the description of the communications system. Some of the elements shown in the communications system are reproduced here since their function is necessary and essential to the operation of the remaining structure and in a few instances, modifications of the structure shown in the description of the communications system have been illustrated in the interest of clarity.

The twisted pair transmission line 21 from the preceding unit is terminated by a pulse terminator 22. The output of the pulse terminator circuit 22 is applied via an OR circuit 23 to a clock and derivation circuit 24. Clock and derivation circuit 24 provides a data output, a shift clock output, a load clock output and a data sample output. These outputs have been previously described in the description of the communications system. The data output is applied to a shift register 25 and the data present on the data output line is shifted into the register 25 by the shift clock output from clock and derivation circuit 24. The shift clock pulses are also applied to a gate circuit 26 which is inserted in the line between the shift register 25 and a pulse driver circuit 27 which drives the twisted pair communications line 21 on the output side of the complex.

The shift clock pulse from clock and derivation circuit 24 are applied to the step input of a bit counter 28. Thus as data is received, bit counter 28 is advanced through the various stages. In the particular embodiment, the bit counter is provided with eight stages since eight bits of data are grouped to form a byte. As the bit counter is stepped from one stage to another, the outputs labeled 1—8 will provide outputs indicative of its position. The bit counter 28 will normally recycle unless it is reset. A reset pulse described in the description of the communications system is applied via an AND circuit 29 which when enabled as will be described later will permit resetting of the bit counter 28. The one output of bit counter 28 is connected to the step input of a byte counter 30 which is provided with five positions and will recycle as pulses are applied from the one output of the bit counter 28. The output positions of byte counter 30 are labeled reset 2, 3, 4 and 5. Again byte counter 30 may be reset by the reset pulse which will be applied to the reset input of the byte counter via an AND circuit 31 when the AND circuit 31 is enabled as will be described later. AND circuits 29 and 31 are in addition to the circuits illustrated in the description of the communications system. These two circuits are provided to prevent a reset of bit counter 28 and byte counter 30 when the circuit is not operating properly due to either an interruption in data or the transmission of mutilated data.

The output bus 32 from shift register 25 is connected to send address control circuit 33 which receives in addition to the data from the shift register via the output bus 32, data sample from circuit 24, the outputs of positions 4, 5, 6, 7 and 8 from bit counter 28 and the not in byte sync signal described in the description of the communications system. The not in byte sync signal is inverted in an inverter 34 and applied to the send address control circuit 33, thus, indicating an in byte sync condition. When the in byte sync condition terminates, send address control circuit 33 provides an output indicating that byte synchronism has not been maintained for a prescribed period of time to indicate a fault has been detected. The output of send address control circuit 33 is inverted in an inverter 35 and the output of the inverter is connected to AND gates 29 and 31 inhibiting a reset under the above described fault condition.

The output of send address control circuit 33 is applied to an AND circuit 36. AND circuit 36 has two additional inputs one of which is connected to bit 8 and the other to load clock. When the three input conditions are satisfied, the output of AND circuit 36 is applied to the strobe input of the shift register 25 via an OR circuit 37 and will strobe the data on the in bus 38 into the shift register 25 where it will be shifted out via gate 26 by the shift clock from circuit 24. The output of send address control circuit 33 is also applied to a fault bit encoder circuit 39. The fault bit encoder circuit in addition receives the five outputs from byte counter 30 and the output of a data present tester circuit 40 and provides unique codes at the various bit times on the in bus 38, to substitute the codes which will be described later in place of the data which is either mutilated or not received. Data present tester 40 receives the data signal from clock and derivation circuit 24 and provides a signal which indicates that data is present on the line. This indicates to the fault bit encoder circuit 39 that the particular fault is mutilated data if data present is indicated. If no data is indicated, then the fault is deemed to have been a break in the line prior to the particular complex.

An address encoder 41 is activated during byte 2. This may be the same address encoder previously described in the description of the communications system and is activated during byte 2 since during this time if a load strobe is available, the address will be inserted in the shift register 25. Fault bit encoder circuit 39 does not supply data to the in bus 38 during byte 2 time. It is during this particular byte time, the address of the terminal complex must be inserted in the shift register 25.

Figure 5:
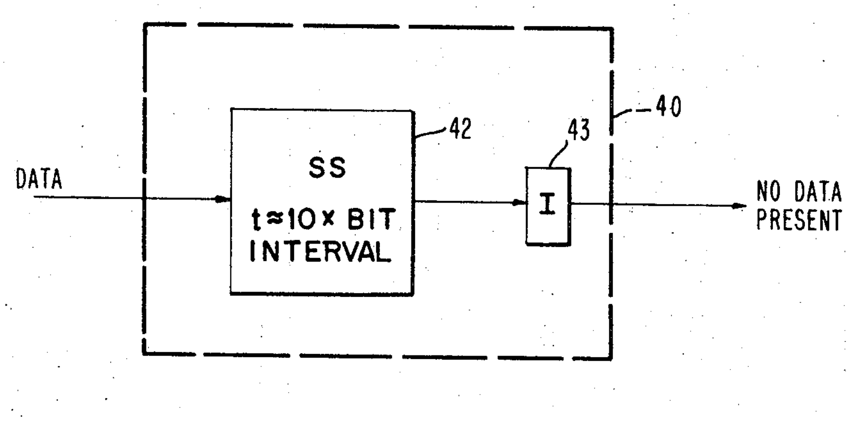
FIGS. 5 to 7 are detailed block diagrams of functional components illustrate in FIG. 4.

Data present test circuit 40 shown in detail in FIG. 5 includes a single shot circuit 42 and an inverter 43. The data pulses from the clock and derivation circuit are applied to the single shot circuit 42. Single shot circuit 42 has a time period which is approximately equal to ten times the bit interval. The data pulses, if data is being received, will maintain a single shot circuit 42 which is the set state. However, as soon as ten or more data bits are missed, the single shot circuit will turn off and a no data present indication will be provided by the output of inverter 43.

Figure 6:
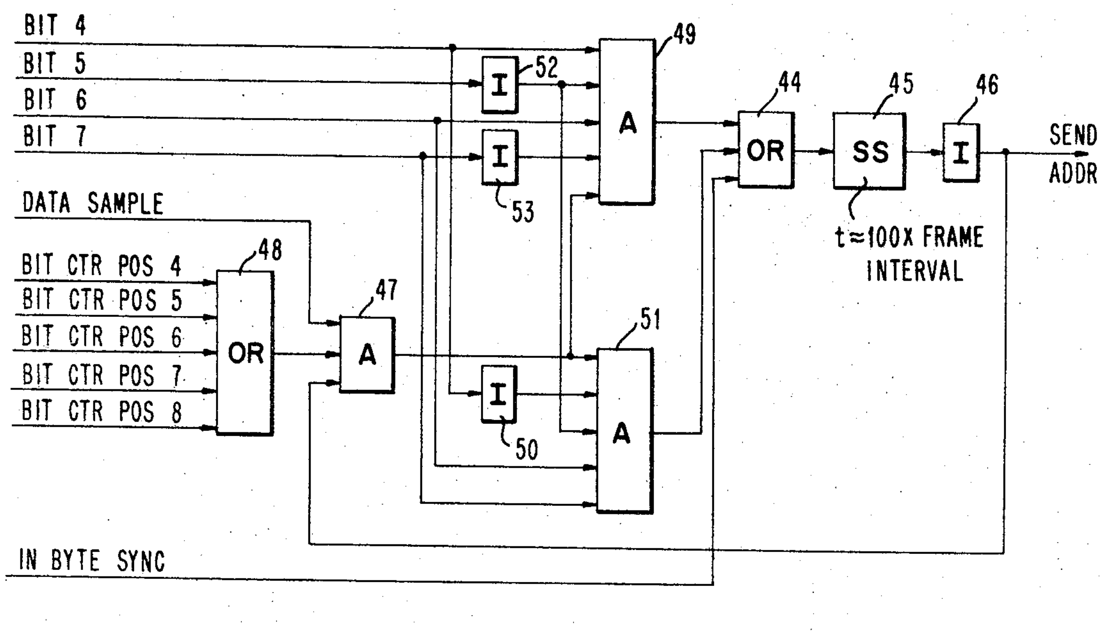

FIG. 6 discloses the details of the send address control circuit which provides two functions. If byte synchronization is not maintained for hundred frame intervals, the circuit will indicate that the address must be sent since it interprets this condition as a failure in the prior circuit in transmission. Once the send address condition is indicated, the circuit monitors the incoming data to determine if proper data is received on the line. The in byte sync signal is applied via an OR circuit 44 to a single shot circuit 45. Single shot circuit 45 has a time period approximately equal to one hundred times the frame interval. Thus, if the terminal is in byte synchronization, single shot circuit 45 will be maintained in the set condition. If in byte synchronism drops for longer than approximately 100 frame intervals, the single shot circuit will then return to its stable state and an output will be generated via an inverter 46 indicating that the send address condition exists. The output of inverter 46 is applied to an AND circuit 47 along with data sample and the output of bit positions 4, 5, 6, 7 and 8 of the bit counter. The output bit positions of the bit counter are combined in an OR circuit 48 before being applied to gate 47.

Bit positions 4, 5, 6 and 7 from the in bus 32 are the only bit positions in the shift register 25 which are utilized. Bit position 4 is supplied to an AND circuit 49 and is inverted in a circuit 50 and applied to another AND circuit 51. Bit position 5 is applied to an inverter 52 and applied to AND circuits 49 and 51. Bit position 6 is applied to both AND circuits 49 and 51. Bit position 7 is inverted in an inverter 53 and applied to AND circuit 49 and applied directly to AND circuit 51. The outputs of AND circuits 49 and 51 are applied via an OR circuit 44 to the single shot circuit 45. In addition, the output of gate 47 is applied to both AND gate 49 and 51.

The AND circuits 49 and 51 are enabled by the output of AND circuit 47 during periods when the send address signal is generated and they examine the bit stream as it comes by through the shift register to determine if valid data is being received. The particular arrangement shown in this figure was selected to operate with the particular sync code used and would have to be varied if different codes are used. The two AND circuits 49 and 51 will detect combinations of bits which will be generated frequently by the proper sync code. As soon as a proper combination is detected by either AND circuit 49 or 51, single shot circuit 45 is set via OR circuit 44 and the send address output is terminated at this time.

This particular portion of this circuit provides recovery after a send address signal has been generated ad recovery will only occur when sync codes are received on the line. Thus, if a break occurs on the line, all stations following the break may institute a send address sequence. The stations will, of course, fall off the line as soon as they receive the send address routine from a previous station. Therefore, only the station immediately following the break or fault in the communications system will take over during a fault and will be the only station maintaining the send address routine.

Figure 7:
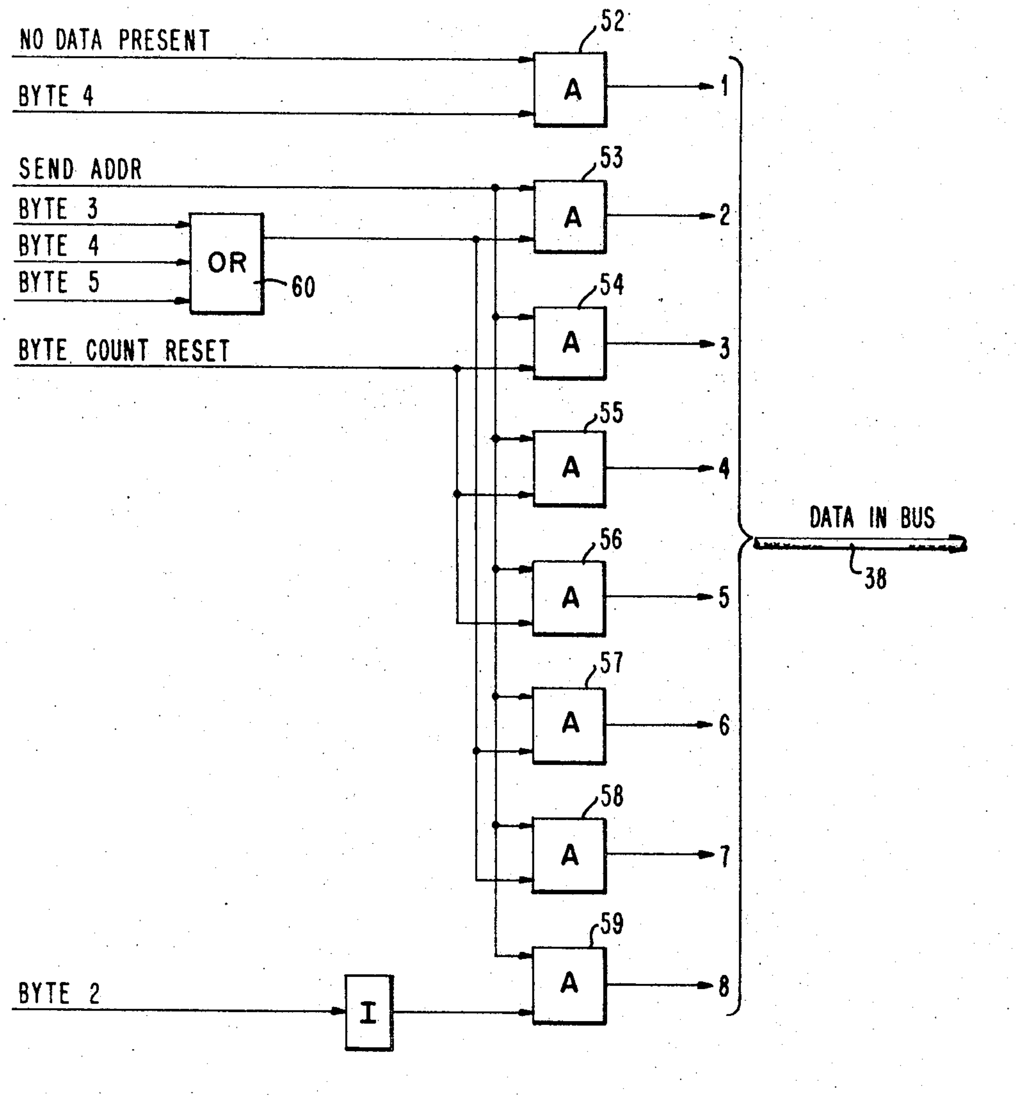

FIG. 7 illustrates one form of a bit encoder. Other types may be utilized if different bit codes are required by the system. In this particular version, eight AND circuits 52—59 are utilized as an encoder. The outputs of the eight AND circuits are connected directly to the bus 38 and will be inserted in the shift register 25 at appropriate times.

AND gate 52 is connected to the number 1 conductor in the data bus 38 which is in turn connected to the number 1 position of the shift register. AND gate 52 is enabled during byte 4 time and will generate a one during byte 4 time if the no data present indication is provided by the output of inverter 43. AND gate 53 is connected to the second data position of bus 38 and responds during byte 3, 4 or 5 times with a one provided the send address output of the inverter 46 is active and indicates a send address condition. Bytes 3, 4 and 5 from the byte counter 30 are applied to an OR circuit 60 which has its output connected to AND gate 53 for enabling this AND gate during these three byte times. AND gate 54 has its output connected to the third bit position in the data bus 38 and AND gate 54 will provide a one output during the reset period of the byte counter 30 when the send address condition is indicated. AND gate 55 has its output connected to the fourth bit position in the data bus and will provide a one output under the same conditions indicated for AND gate 54. AND gate 56 has its output connected to the fifth bit position in the data bus 38 and like gates 54 and 55 provide the one output under the same conditions. AND gate 57 has its output connected to the sixth bit position in data bus 38 and provides a one indication during bytes 3, 4, or 5 times under the send address condition. The enabling input from AND gate 57 is connected to the output of OR circuit 60. AND gate 58 has its output connected to the seventh bit position in the data bus 38 and is controlled in an identical fashion as AND gate 57. AND gate 59 has its output connected to the eighth bit position in data bus 38 and will provide a one when the send address condition is indicated, provided byte 2 is not present. That is, during reset and bytes 3—5. During byte 2, the unique address of the complex is provided by circuit 41 as previously described in the description of FIG. 4. Thus the data patterns for bytes reset through 5 are controlled by the fault bit encoder circuit 39 with the exception of byte 2 which is controlled by the address encoder 41 shown in FIG. 4. The particular codes generated are quite arbitrary and other codes could have been selected. However, these were selected for optimum operation with the particular communications system disclosed and others could be used for different communications systems.

OPERATION

If byte synchronization is lost for one hundred frame intervals, the output developed by single shot 45 goes down and via inverter 46, the send address signal is initiated. This signal may be initiated for one of two reasons, either data has not been received or the data received is mutilated and therefore byte synchronization becomes impossible. If data is being received, the data received via pulse terminator 22 is used to run the clock for clocking out the locally generated data. If no data is received, the data present tester 40 develops a no data output which performs two functions. It is used to generate the clock signals for running shift register 25 and inserting the data from the fault bit encoder 39 from the address encoder 41 into the shift register. In addition, it is applied to the fault bit encoder 39 specifically to AND gate 52 to set the first bit position to a one during byte four to indicate that the fault is a failure of data on the incoming line. If data is received and mutilated, the data present tester 40 provides no output and the first bit during byte four will be a zero indicating that the source of the fault is mutilated data.

When the send address signal is generated, the recovery portion of the send address control circuit 33 is energized via AND circuit 47 during the data sample time and bits 4, 5, 6, 7 and 8 from bit counter 28. The send address signal is applied to the fault bit encoder circuit 39 and causes the patterns previously described to be generated during the reset 3, 4 and 5 byte times. During byte 2 time, address encoder 41 sends the unique address of the terminal complex which is under control of the byte 2 output of the byte counter 30. AND gate 36 will cause data from the fault bit encoder 39 and the encoder 41 to be inserted in shift register 25 under the conditions specified previously. That is, the send address output, bit 8 from the bit counter 28 and the load clock signal from the clock and derivation circuit 24.

As soon as data is received, the recovery portion of the send address control circuit 39 sets the single shot circuit 45 terminating the condition. Thus, when a fault occurs on the loop, all of the stations following the fault attempt to send their address and each is knocked off the line by the previous station until the station immediately following the fault is the only remaining station sending its address. The central station monitors the line and can tell from the address sent during the byte two period and the condition of bit one during byte four, the location of the fault and the type of fault which has occurred. The location will be determined by the address of the last sending station. This will indicate that the fault occurred prior to that station and the type of fault will be indicated by bit one of byte four. If a one is present in this bit position of this byte, it will indicate that there was no data present and the fault occurred either in the wire between the station sending its address and the next preceding station or that the next preceding station had a faulty transmitter. If the first bit position of byte four is a zero, this indicates that there is no break in the wire that the previous station is transmitting, however, it is misusing data or inserting faulty data onto the line and the station must be removed.

The type of corrective action will depend on the particular system. However, a repairman can be sent to a specific location, thus reducing the area which must be examined to correct or remove the fault condition. This can amount to a substantial savings in a terminal complex having a hundred terminals with as much as 1000 feet of wire separating them.

While the invention has been particularly shown and described with reference to a preferred embodiment thereof, it will be understood by those skilled in the art that various changes in form and details may be made therein without departing from the spirit and scope of the invention.

We claim:

1. A fault locator system for a serial loop data communications system having a plurality of serially connected terminals and a central control station connected to both ends of the serial line forming a loop and characterized by:
fault detection and signalling means at each terminal and comprising;
means for detecting an out of synchronous condition existing for a predetermined time and for indicating a fault condition upon the occurence of said condition;
means responsive to the indication of a fault condition for transmitting on the loop a predetermined signal including a unique group of bits identifying the particular terminal location; and
means responsive to incoming data for detecting nonfaulty signals from a previous terminal for interrupting the signal transmitting means.

2. A fault locator system as set forth in claim 1 in which the means for detecting an out of synchronous condition includes circuit means rendered active by a synchronous condition for a period substantially longer than required to transmit one cycle of a data channel whereby temporary losses of synchronization will not initiate a fault routine.

3. A fault locator system for a serial loop data communications system having a plurality of serially connected terminals and a central control station connected to both ends of the serial line, thus forming a loop characterized by:
fault detection and signalling means at each terminal and comprising;
means for detecting an out of synchronous condition existing for a predetermined time and for indicating a fault condition upon the occurrence of said condition;
means for monitoring the received data for indicating a failure of received data;
means responsive to the indication of a fault condition and the failure to receive data for transmitting on the loop, a first predetermined signal including a unique group of bits identifying the particular terminal location when both a fault condition and failure to receive data occur simultaneously and for transmitting a second signal including the same unique group of bits identifying the terminal when a fault condition only exists; and
means responsive to incoming data for detecting nonfaulty signals from a previous terminal for interrupting the signal transmitting means.

4. A fault locator system as set forth in claim 3 in which the means for detecting an out of synchronous condition includes circuit means rendered active by a synchronous condition for a period substantially longer than required to transmit one cycle of a data channel whereby temporary losses of synchronization will not initiate a fault routine.

5. A fault locator system as set forth in claim 4 in which the means for monitoring the received data for indicating a loss of data includes circuit means rendered active by the received data for a time period substantially longer than the data bit interval whereby a loss of signal indication will not be provided until the loss persists for a time period determined by the active period of the said circuit means.

6. A fault locator system for a serial loop data communications system having a plurality of serially connected terminals and a central control station connected to both ends of the serial line, thus forming a loop characterized by:
fault detection and signalling means at each terminal and comprising;
means for detecting several transmission fault conditions and providing an indication of each transmission fault detected;
means responsive to the fault indications for transmitting on the loop predetermined signals indicating the nature of the fault, said signals including a unique group of bits identifying the particular terminal location; and
means responsive to incoming data for detecting nonfaulty signals from a previous terminal for interrupting the signal transmitting means.